United States Patent [19]

Bakowsky et al.

[11] Patent Number: 4,573,162
[45] Date of Patent: Feb. 25, 1986

[54] GAS LASER, PARTICULARLY FAST AXIAL FLOW GAS TRANSPORT LASER

[75] Inventors: Lothar Bakowsky, Hofheim; Eckhard Beyer, Ober-Ramstadt; Gerd Herziger, Robdorf; Peter Loosen, Mainz, all of Fed. Rep. of Germany

[73] Assignee: Messer Griesheim GmbH, Frankfurt am Main, Fed. Rep. of Germany

[21] Appl. No.: 614,512

[22] Filed: May 29, 1984

[30] Foreign Application Priority Data

Jul. 2, 1983 [DE] Fed. Rep. of Germany ....... 3323954

[51] Int. Cl.⁴ ............................................. H01S 3/03
[52] U.S. Cl. ....................................... 372/61; 372/58; 372/92

[58] Field of Search ................. 372/61, 55, 58, 34, 372/59, 92, 98

[56] References Cited

U.S. PATENT DOCUMENTS

| 3,863,103 | 1/1975 | Eckbreth et al. | 372/58 |
| 4,242,646 | 12/1980 | Macken | 372/61 |
| 4,242,647 | 12/1980 | Macken | 372/61 |
| 4,356,565 | 10/1982 | Shen | 372/61 |
| 4,500,998 | 2/1985 | Kuwabara et al. | 372/58 |

Primary Examiner—Léon Scott, Jr.
Attorney, Agent, or Firm—Connolly and Hutz

[57] ABSTRACT

A fast axial flow gas transport laser has a discharge tube. The discharge tube has at least one sudden discontinuous enlargement of the cross section of the discharge tube.

27 Claims, 4 Drawing Figures

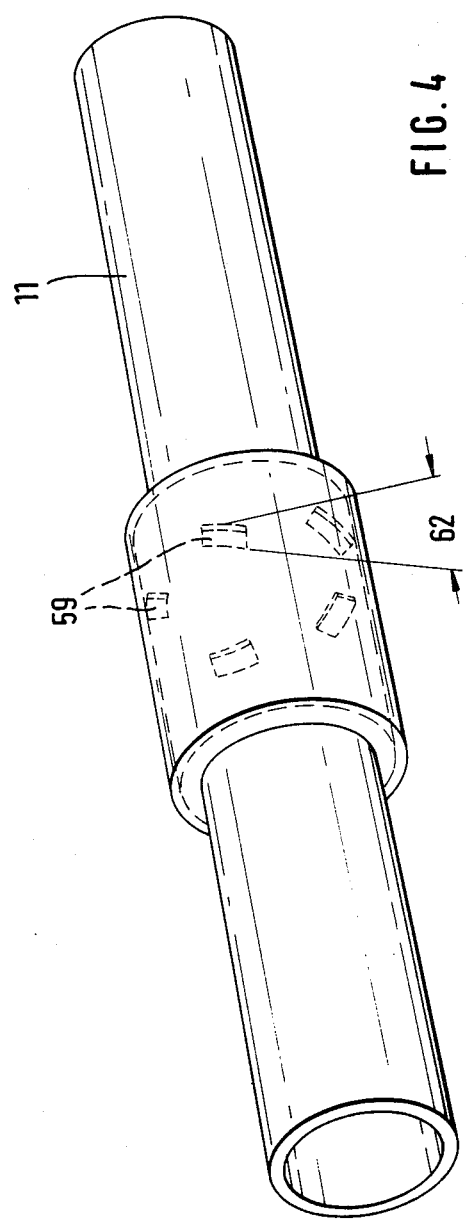

GAS LASER, PARTICULARLY FAST AXIAL FLOW GAS TRANSPORT LASER

BACKGROUND OF INVENTION

The invention concerns a gas laser, particularly a fast axial flow gas transport laser having a discharge tube.

In order to increase the laser output performance in such gas lasers, the inside diameter of the discharge tube should guarantee, on one hand, optimum throughflow of laser gas with minimum variation of pressure loss between the intake and outlet openings of the discharge tube, and, on the other hand, the homogeneity of the discharge in the discharge tube by means of a swirling of the laser gas.

In order to fulfill these requirements in a fast flow gas laser, it is known, on one hand, how to design the inside cross section according to the diameter of the laser gas beam and, on the other hand, how to achieve homogeneity of the laser gas discharge by action to guide the flow. Hereby, the discharge of the laser gas occurs over ring electrodes arranged in end heads.

In this known development of the discharge tube with optimum tube diameter and laser gas inflow at ring electrodes, it is a disadvantage that no complete homogeneization is achieved.

A slow flow laser with stabilized swirling flow is known from German DE-OS No. 30 27 321 (U.S. Pat. No. 4,242,647) in which at least one ribbed ring is arranged in the discharge tube concentrically with the longitudinal axis of the discharge tube.

Studies have shown that such a ribbed ring arranged in the discharge tube in the fast flow gas laser described at the outset does not increase the laser output performance.

SUMMARY OF INVENTION

An object of the invention is to increase the laser output performance per meter discharge tube length while maintaining the same dimensions of the construction.

An additional object is to improve the beam quality by homogeneization of the laser discharge. This problem is solved by providing the discharge tube with a sudden discontinuous enlargement.

The advantages obtained with the invention consist particularly therein that with a tangetial laser inflow and with slotted gas distribution, the homogeneization of the gas discharge over the entire discharge tube length and thereby also the maximum output performance of the gas laser per meter discharge tube length can be increased from hitherto 500 Watt to 1000 Watt without significant enlargement of the construction unit, namely by means of the sudden discontinuous increase of the interior cross section of the discharge tube and the stops arranged in the enlarged cross section. In addition to an increase of the processing speed by means of the invention and time-related stabilization of the performance, one can achieve primarily a quality improvement and reproducibility of the welding results as well as decreased soiling of the mirror.

THE DRAWINGS

FIG. 4 is a perspective representation of the discharge tube with the stop arrangement in the diffuser.

DETAILED DESCRIPTION

Figure 1:
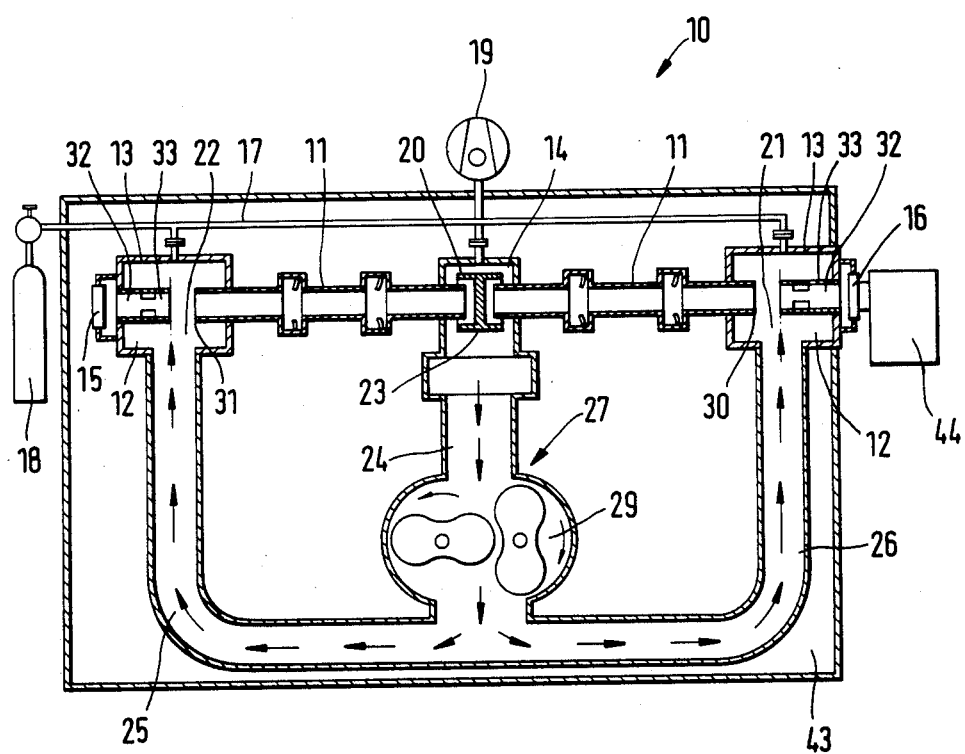
FIG. 1 is a schematic structure of the axial flow gas transport laser.

In FIG. 1, an axial flow gas transport laser is identified as 10. The laser 10 basically consists of two laser discharge tubes 11 which rest in bearings in two end heads 12 and are connected to one another over a connector head 20. The end head 12 and the connector head 20 are connected to a high voltage source which is not shown in detail. The plug pole of the high voltage source is connected to the interior spaces 13 of the end heads 12, and the minus pole of the high voltage source is connected to the interior space 14 of the connector head 20. It is particularly advantageous, if the end heads 12 and the connector head 20 are fabricated of aluminum.

The laser mirrors are identified with 15 and 16.

A quantity of laser gas is continuously fed to the laser 10 over lines 17. The laser gas is preferably a mixture of helium, nitrogen and carbon dioxide. The discharge tube 11 is connected to a vacuum pump 19 in order to maintain a mean pressure of approximately 70 mbar within the discharge tube.

A laser gas intake opening 21, 22 is provided at each one of the end heads 12. Further the connector head 20 has a laser gas outlet opening 23 preferably in the center. Gas intake openings 21 and 22 as well as the gas outlet opening 23 are connected via lines 24, 25, 26 with a unit 27 for cooling and transporting the laser gas. The cooling/transport unit 27 has a blower 29 which is preferably developed as a Roots blower. A flow direction towards the laser mirror arrangement 15, 16 is achieved by means of the tangential inflow of the laser gas at the end heads 12 and the suction at the connector head 20, and, thus, the danger of soiling the catcher plate and mirrors 15, 16 is decreased.

Figure 3:
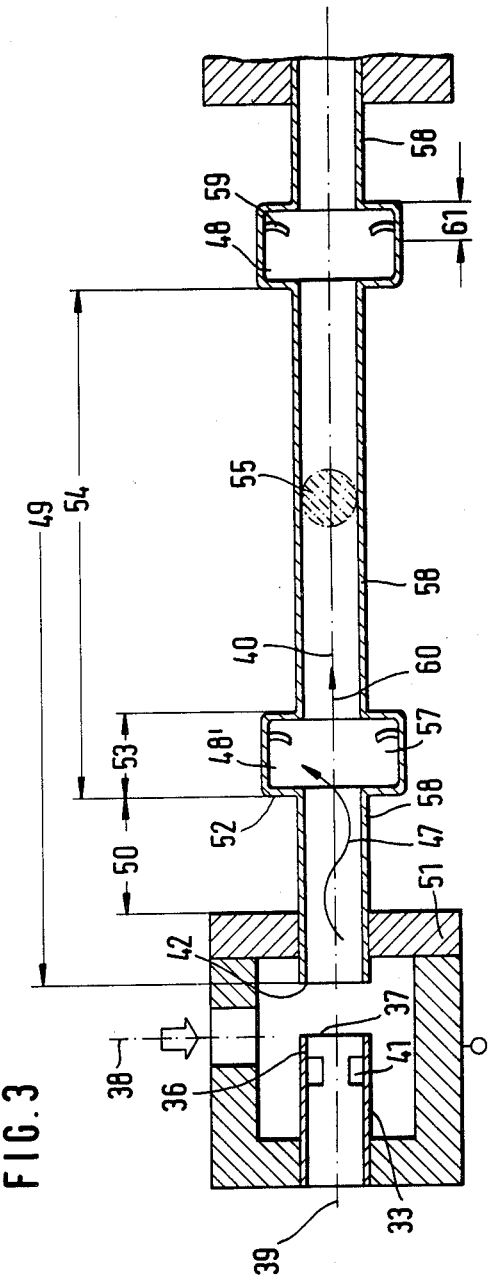
FIG. 3 is a schematic longitudinal section of the discharge tube according to the invention with an end head and a gas distributor.

A gas distributor 32, developed as a tube 33, is provided in each one of the end heads 12, opposite the ends of the discharge tubes 30, 31. The gas distributors 32 are designed as jibs, the edges 37 of which are arranged congruently with the free ends 36 with respect to the center axis 38 of the gas intake openings 21, 22 (FIG. 3). Preferably each of the gas distributors 32, the center axis 39 of which coincide with the center axis 40 of the discharge tube, has three slot-shaped cutouts 41 at the free ends 36 of the jib. The slot-shaped cutouts 41 are preferably inserted into the glass tube 33 at a distance of 14 mm from the edge 37. The width of the slots 41 arranged perpendicularly to the center axis 39 at the circumference of the gas distributor 32 is preferably 10 mm, and the distance between the edge 37 and the front end 42 of the laser gas discharge tube 11 should preferably also be 10 mm.

As is further shown in FIG. 1, the entire gas transport laser 10 is developed as one construction unit and accommodated in a common housing 43. A cutting head 44 is attached to the construction unit/housing 43 in which the laser beam can be focused on a work piece to be processed by means of mirrors and other optical devices.

Figure 2:
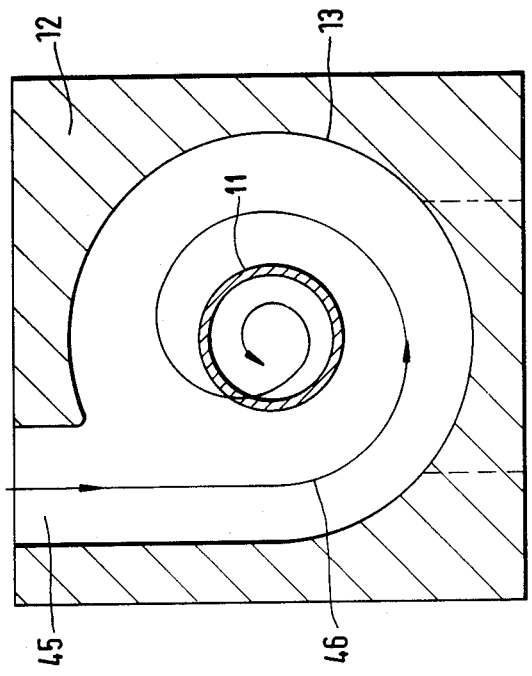
FIG. 2 is a schematic section of the tangential laser gas inflow.

FIG. 2 shows, in a schematic representation, a section of the tangential laser gas inflow according to the direction of the arrow 45 into an end head 12, and of the discharge tubes 11. Thereby, the transport of the laser gas into the end head 12 takes place through the lines 24, 26 and from there into the discharge tubes 11. On one hand, this tangential laser gas inflow 45 in combination with the slotted gas distributor 32 causes a homogenization in the end head 12. The discharge begins homogeneously in the interior spaces 13. On the other hand, the tangential laser gas inflow 45 causes a forced gas rotation so that the discharge contracts towards the end of the tube.

The rotation produced by this forced rotation impulse 46 of the laser gas causes a zone of low speed in the discharge tubes 11 which, in turn, leads to the development of a macro-swirl 47. As shown in FIG. 3, the discharge tubes 11 display sudden discontinuous enlargements 48 of the cross section of the discharge tube (Carnot diffusors) at two locations defined by the wavelength of the macro-swirl 47.

For a selected discharge tube length 49 of 600 or 460 mm, empirical studies have indicated a distance 50 of 50 mm between the wall of the end head bearing 51 and the beginning 52 of the enlargements 48 of the cross section of the discharge tube. 40 mm was calculated to be the preferred length 53 of the enlargements 48 of the cross section of the discharge tube provided in a diffusor part 57 in a discharge tube. The distance 54 between the first and the second diffusor 57 should preferably amount to 220 mm. With a 28 mm inside cross section 55 of the discharge tube module 11, the enlarged cross section of the discharge tube amounted to 40 mm.

With respect to stability and heat conductance, metals, ceramics or glass have been proven to be particularly advantageous diffusor materials.

Together with the adjacent laser discharge tube portions 58, the diffusors 57 shown in FIG. 3 form one unit in one piece.

Naturally, it is also possible to connect the diffusors 57 interchangeably with the discharge tubes 11 so that when there is a change in operational conditions or the development of the macro-swirl 47, the distances 50, 54 and the design of the discharge tube portions 58 and the diffusors 57 can be adjusted to these new operational conditions in the simplest possible manner.

Due to the sudden and discontinuous enlargements 48 of the cross section of the discharge tube, stops 59 have been provided which are preferably twisted at an angle of incidence 62 of between 15° and 30° against the direction of the laser gas, the stops 59 have a fixed connection with the diffusors 57 as shown in FIG. 3 and FIG. 4.

Naturally it is also an advantageous possibility to make the stops 59 in the diffusors 57 interchangeable and adjustable. As the first practical experiments have shown, an adjustable design of the angle of incidence 62 as well as of the elevation and the position of the stops 59 on the circumference of the diffusor 57 is particularly appropriate. As shown particularly in FIG. 4, the diffusor 57 preferably has five stops 59 consisting of one of the materials metal, glass or ceramic.

An increase of the output performance from hitherto 500 Watt to 1000 Watt was achieved with the initially described axial flow gas transport laser 10 with two discharge tubes 11 according to the invention.

What is claimed is:

1. In a fast axial flow gas transport laser having a discharge tube through which laser gas flow, the improvement being said discharge tube having at least one sudden irregular enlargement of the cross section of said discharge tube, stops being mounted in said enlargement of the cross section of said discharge tube, and said discharge tube being connected to one end head having a tangential laser gas intake opening and to one end head having a laser gas outlet opening; enlargement of the cross section of said discharge tube being at specific points in said discharge tube as determined by the wavelength of the macro-vortex which forms in said discharge tube as a result of a rotation impulse generated by tangential laser gas inflow.

2. Gas laser according to claim 1, characterized thereby that said enlarged cross section of said discharge tube is from 1.2 to 1.6 times the interior cross section of said discharge tube.

3. Gas laser according to claim 1, characterized thereby that said enlarged cross section of said discharge tube is contained in a discharge tube diffusor.

4. Gas laser according to claim 3, characterized thereby that said discharge tube diffusor has a length of 40 mm.

5. Gas laser according to claim 3, characterized thereby that said diffusor in combination with the adjacent portions of said discharge tube forms one unit in one piece.

6. Gas laser according to claim 5, characterized thereby that said diffusor has an interchangeable connection with said adjacent portions of the discharge tube.

7. Gas laser according to claim 3, characterized thereby that the material of said diffusor is metal.

8. Gas laser according to claim 3, characterized thereby that the material of said diffusor is ceramic.

9. Gas laser according to claim 3, characterized thereby that the material of said diffusor is glass.

10. Gas laser according to claim 3, characterized thereby that said stops are twisted against the flow direction of the laser gas at an angle of incidence between 15° and 30°.

11. Gas laser according to claim 3, characterized thereby that said stops are arranged in the rear area of said diffusor in the direction of the laser gas flow.

12. Gas laser according to claim 3, characterized thereby that said stops have a fixed attachment in said diffusor.

13. Gas laser according to claim 3, characterized thereby that said stops in said diffusor are interchangeable.

14. Gas laser according to claim 3, characterized thereby that said stops in said diffusor are adjustable.

15. Gas laser according to claim 3, characterized thereby that the angle of incidence of said stops is adjustable.

16. Gas laser according to claim 3, characterized thereby that said stops are movable on the circumference of said diffusor.

17. Gas laser according to claim 3, characterized thereby that the elevation of said stops to the center axis of said diffusor is adjustable.

18. Gas laser according to claim 3, characterized thereby that said stops consist of a material selected from the group consisting of metal, glass, ceramic and a combination thereof.

19. Gas laser according to claim 3, characterized thereby that five of said stops are provided in said diffusor.

20. Gas laser according to claim 1, characterized thereby that a gas distributor is provided in one of said end heads.

21. Gas laser according to claim 20, characterized thereby that the center axis of said gas intake opening is arranged congruently with the edge of a free end of said gas distributor.

22. Gas laser according to claim 21, characterized thereby that said gas distributor is designed as a tube.

23. Gas laser according to claim 22, characterized thereby that said center axis of said gas distributor coincides with the center axis of said discharge tube.

24. Gas laser according to claim 22, characterized thereby that the distance between the edge and the front end of the discharge tube is no less than 3 mm and no more than 20 mm.

25. Gas laser according to claim 22, characterized thereby that said gas distributor consists of a non-conductive material.

26. Gas laser according to claim 1, characterized that said two ends heads are supplied with high voltage.

27. Gas laser according to claim 26, characterized thereby that said high voltage is supplied to the inner spaces of said two end heads.

* * * * *